United States Patent [19]

Qualeatti et al.

[11] Patent Number: 4,519,951
[45] Date of Patent: May 28, 1985

[54] SELECTIVE REDUCTION OF FATTY MATERIALS USING A SUPPORTED GROUP VIII METAL IN EGGSHELL DISTRIBUTION

[75] Inventors: Gail M. Qualeatti, Palatine; Blaise J. Arena, Des Plaines, both of Ill.

[73] Assignee: UOP Inc., Des Plaines, Ill.

[21] Appl. No.: 511,052

[22] Filed: Jul. 5, 1983

[51] Int. Cl.$^3$ .......................... C11C 3/12; C11C 1/00
[52] U.S. Cl. ...................................... 260/409; 260/413
[58] Field of Search ................................ 260/409, 413

[56] References Cited

U.S. PATENT DOCUMENTS

| | | | |
|---|---|---|---|
| 3,431,085 | 3/1969 | Cimerol et al. | 260/409 X |
| 3,595,887 | 7/1971 | Kulkarni et al. | 260/409 |
| 3,743,662 | 7/1973 | Eurlings et al. | 260/409 |
| 3,778,465 | 12/1973 | Barnstorf | 260/409 |
| 3,792,067 | 2/1974 | Coombes et al. | 260/409 |
| 4,113,658 | 9/1978 | Geus | 252/454 |
| 4,128,506 | 12/1978 | Hegedus et al. | 252/466 |
| 4,188,333 | 2/1980 | Cohen | 260/409 |
| 4,356,197 | 10/1982 | Devitt et al. | 260/409 X |
| 4,376,724 | 3/1983 | Mita et al. | 252/460 |
| 4,424,163 | 1/1984 | Rosen | 260/409 |

OTHER PUBLICATIONS

Neimark, Kheifez, & Fenelonov, *Ind. Eng. Chem. Prod. Res. Dev.*, 20, 439, (1981).

Cervello, in "Preparation of Catalysts," B. Delmon et al., Editors, Elsevier Scientific Publishing Co. (Amsterdam), 1976.

*Primary Examiner*—Helen M. S. Sneed
*Attorney, Agent, or Firm*—James R. Hoatson, Jr.; Eugene I. Snyder; William H. Page, II

[57] ABSTRACT

Substantial improvement in the selectivity of reduction of fatty materials may be obtained using as a catalyst a zerovalent Group VIII metal dispersed in an eggshell distribution on a porous support. When the catalyst is nickel on gamma-alumina it is possible to perform continuous reduction using a fixed catalyst bed with selectivities which equal or exceed that exhibited by conventional nickel catalysts used in a batch process.

16 Claims, 1 Drawing Figure

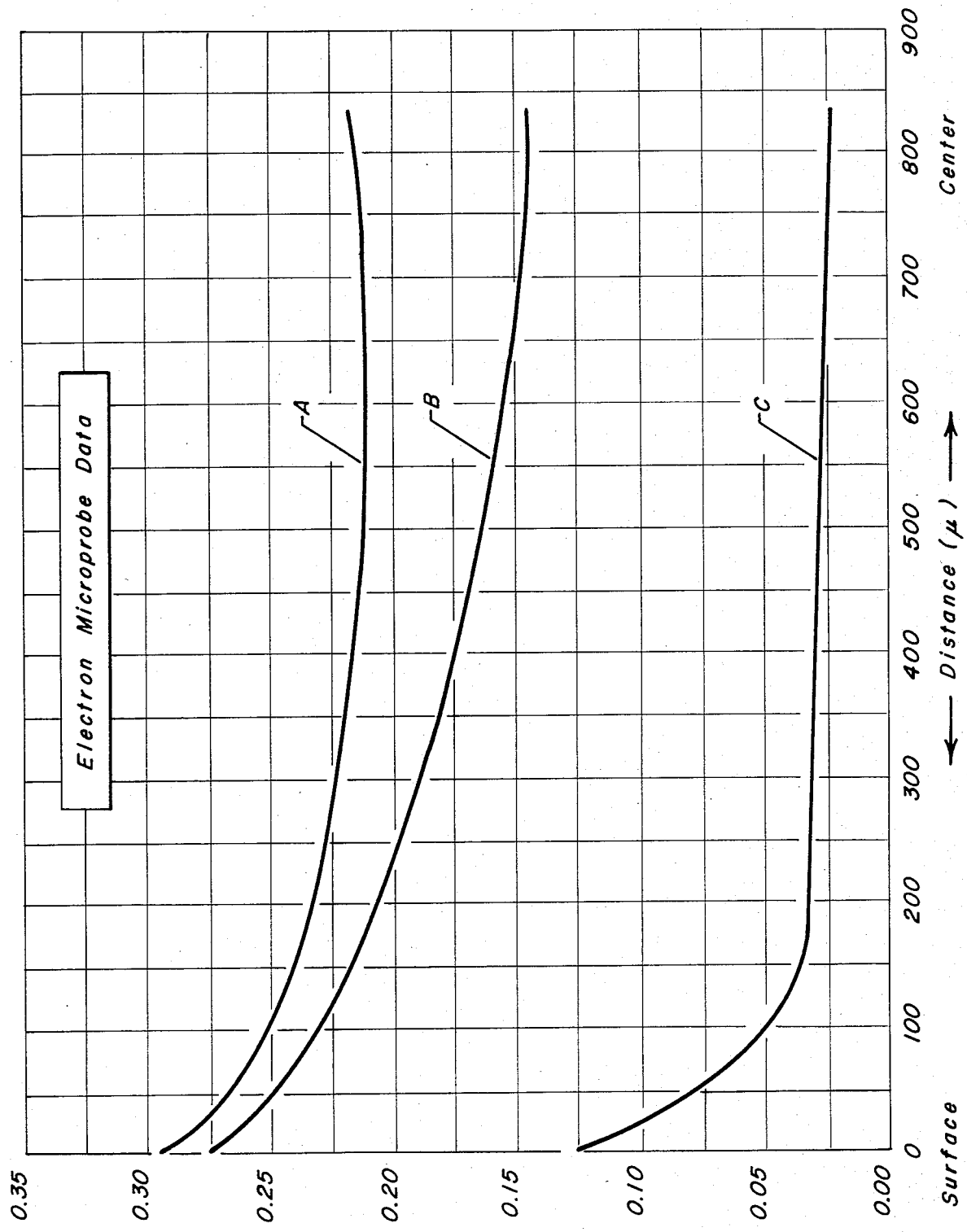

SELECTIVE REDUCTION OF FATTY MATERIALS USING A SUPPORTED GROUP VIII METAL IN EGGSHELL DISTRIBUTION

BACKGROUND OF THE INVENTION

Although some edible oils are used per se, by far the largest portion are hydrogenated, or hardened, prior to their end use. The purpose of such hydrogenation is to increase the stability of the final product. For example, processed soybean oil is susceptible to oxidation resulting in deterioration of its organoleptic properties upon storage even at ambient temperature. Where the oil is to be used at higher temperatures, for example, as a frying oil, the adverse organoleptic consequence of oxidation become even more pronounced.

The commonly accepted origin of oxidative deterioration is attributed to highly unsaturated components, such as the triene moiety, linolenate, in soybean oil. Partial hydrogenation to remove most of this component leads to a marked increase in the oxidative stability of the resulting product, thereby facilitating storage and permitting unobjectionable use at higher temperatures. Ideally, one desires this hydrogenation to be highly specific, reducing only triene to the diene, linoleate, without affecting other unsaturated components and without effecting cis to trans isomerization. In practice, this goal is unachievable.

The edible fats and oils which are the subject of this invention, collectively referred to as fatty materials, are triglycerides of fatty acids, some of which are saturated and some of which are unsaturated. In vegetable oils, the major saturated fatty acids are lauric (12:0), myristic (14:0), palmitic (16:0), stearic (18.0), arachidic (20:0), and behenic (22:0) acids. The notation, "18:0," for example, means an unbranched fatty acid containing 18 carbon atoms and 0 double bonds. The major unsaturated fatty acids of vegetable oils may be classified as monounsaturated, chief of which are oleic (18:1) and erucic (22:1) acids, and polyunsaturated, chief of which are the diene, linoleic acid (18:2), and the triene, linolenic acid (18:3). Unhardened vegetable fats and oils contain virtually exclusively cis-unsaturated acids.

In the context of partial hydrogenation, the ultimate goal is the reduction of triene to diene without attendant trans-acid formation or saturate formation. In practice, it is observed that partial reduction results in lowering both triene and diene and increasing the monoene, saturate, and trans levels. Because it is desired that the product of partial hydrogenation itself be a liquid oil relatively free of sediment or even cloudiness upon storage at, for example, 10° C., the formation of saturated and trans acids in such hydrogenation is a vexing problem. Removal of these solids, whose relative amount is measured by the Solid Fat Index (SFI), is a relatively costly and inefficient process attended by large losses associated with the separation of gelatinous solids from a viscous liquid. It is known in the art that such solids are composed largely of triglycerides containing at least one saturated fatty acid moiety and/or trans monounsaturated fatty acid moiety with the predominant culprits having at least 18 carbon atoms. It is further known in the art that fatty acid analysis alone may be an insensitive analytical tool, that is to say, two products of hydrogenation of, for example, soybean oil may be vastly different in their SFI while having virtually identical fatty acid analysis. This arises because the distribution of the saturated moieties in the triglyceride is important. The solubility in the soybean oil of disaturated triglycerides is much less than twice the amount of monosaturated triglycerides, and the solubility of monosaturated triglycerides may depend upon whether the other fatty acid moieties of the triglyceride are monounsaturated, diunsaturated, etc., and may also depend upon whether the saturated portion is at the one- or two- position of the triglyceride. Hence, hydrogenation of edible fats and oils is largely an empirical process, whose analytical tools most often include SFI supported by fatty acid analysis.

Group VIII metals on porous supports such as alumina, silica, and various clays as bentonite, long have been used as a catalyst in the hydrogenation of fatty materials. Partly because of its more favorable selectivity characteristics relative to other members, nickel appears to be the most widely used of such metals. But even nickel is only partially successful in achieving the ideal goal as elaborated above, one consequence of which is that for reductions of fatty materials to be sufficiently selective to meet commercial demands it is virtually obligatory to conduct the hydrogenation in a batch process.

We have discovered that when Group VIII metals are dispersed on porous supports with an eggshell distribution of the metal, the resulting catalytic materials give substantially improved selectivity in the hydrogenation of fatty materials. This observation forms the basis for the invention described herein, which is a method for selectively hydrogenating fatty materials by either batch or continuous process. The utility and importance of this invention is readily discerned when it is appreciated that commercial methods of continuous reductions of fatty materials are at once highly desirable and extraordinarily difficult, with no general method presently available for widespread industrial usage.

Metals dispersed on supports with an eggshell distribution are known. In U.S. Pat. No. 4,113,658 Geus describes a process of achieving such a distribution and requires quite small particles of the carrier as a nucleating agent for the deposited metal. The patentee ascribes increased catalytic activity to such preparations, resulting from a higher surface area. U.S. Pat. No. 4,128,506 describes a process wherein a layered catalyst, effective in automotive emission control, may be produced. U.S. Pat. No. 4,376,724 teaches a rhodium dispersed on silica or titania with an eggshell distribution where the purpose of such a distribution is to achieve economy in metal utilization, the patentee appreciating that metals in the interior of a support often do not participate, or participate to a lesser extent, in catalytic reactions. However, in none of these do the patentees recognize that deposition of a metal on a porous support with an eggshell distribution may have an appreciable effect on selectivity in catalytic hydrogenation of polyunsaturated compounds as are found in fatty materials.

SUMMARY OF THE INVENTION

The object of this invention is to provide a method of selective reduction of fatty materials. An embodiment of the invention is the reduction utilizing a catalyst comprising a zerovalent Group VIII metal dispersed with an eggshell distribution on a porous support. One such catalyst consists essentially of nickel dispersed on gammaalumina where most of the metal is located within 0.15 radius of the surface. Other objects and embodiments appear within.

DESCRIPTION OF THE FIGURE

The FIGURE depicts electron microprobe data of nickel distribution in catalysts A, B, and C of Example 1 as a function of distance from the catalyst surface.

DESCRIPTION OF THE INVENTION

The invention described herein is based on our discovery that a catalyst comprising a zerovalent Group VIII metal dispersed with an eggshell distribution on a porous support displays superior selectivity in the hydrogenation of fatty materials relative to the same metal dispersed uniformly throughout the same support. The process which is our invention is a method of selectively reducing fatty materials where the selectivity permits a continuous hydrogenation process using a fixed catalyst bed. Briefly, the invention described within is a method for the selective reduction of a fatty material comprising contacting under hydrogenation conditions the fatty material with hydrogen and a catalyst which comprises a zerovalent Group VIII metal dispersed with an eggshell distribution on a porous support, and recovering the selectively reduced product.

An index of selectivity relied upon here and commonly used elsewhere can be better understood from the following partial reaction sequence, where k is the rate constant for the indicated hydrogenation step.

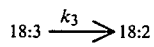

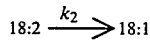

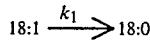

$S_{LN} = k_3/k_2$ $S_{LO} = k_2/k_1$ $S_{LN}$ is termed the linolenate selectivity; a high value is characterized by relatively high yields of dienoic acid in the reduction of an unsaturated triglyceride containing trienoic acids. $S_{LO}$ is the linoleate selectivity; a high value is characterized by relatively high yields of monoenoic acid in the reduction of an unsaturated triglyceride containing dienoic acids. An oil such as soybean oil contains both trienoic and dienoic acids, thus $S_{LN}$ and $S_{LO}$ may be measured simultaneously.

The catalyst used in the process of this invention shows substantially increased values of $S_{LN}$ and $S_{LO}$ relative to the prior art catalysts. Thus, the catalysts described herein are more selective than their prior art predecessors.

The method described herein is generally applicable to edible oils and fats of vegetable and animal origin, collectively referred to herein as fatty materials. Because the partial hydrogenation of liquid oils to afford hardened, but still liquid, oils occupies a prominent part within the domain of hydrogenation of edible oils and fats, the method of this invention is particularly applicable to such partial hydrogenation. Thus, the described method of hydrogenation is especially useful to partially harden edible liquid oils whereby the iodine value (IV) is lowered from about 10 to about 30 units by hydrogenation. The term "iodine value" is a measure of the total extent of unsaturation in an edible oil or fat as performed by a standard test. In the context of soybean oil, which is a particularly important liquid vegetable oil, partial hardening is continued to an IV drop of from about 15 to about 25 units.

Although the method claimed herein is especially valuable when applied to the partial hydrogenation of liquid vegetable oils, it must be explicitly recognized that the selectivity of the claimed method is also manifested in more extensive hydrogenations. Thus, as is shown below, the claimed method may be used generally in hydrogenating edible oils wherever increased selectivity relative to other Group VIII catalysts is desired.

The method of this invention is especially applicable to liquid vegetable oils. Examples of such oils include soybean oil, cottonseed oil, sunflower oil, safflower oil, rapeseed oil, and liquid fractions from palm oil. The application of this method to soybean oils is especially important. As will be recognized by those skilled in the art, partial hydrogenation of liquid oils to afford partially hardened liquid oils is especially demanding, hence it is to be expected that a method suitable for this task also is suitable for more extensive hydrogenation. Thus, the method described herein also is suitable for more extensive hydrogenation, where the change in IV is from about 30 to about 70 units. Oils and fats which can be so hydrogenated include those above, their partially hydrogenated products, and also such feedstocks as palm oil.

The catalyst of this invention is a zerovalent Group VIII metal dispersed with an eggshell distribution on a porous support. "Eggshell distribution" refers to the situation where the zerovalent metal is located primarily in a layer at and near the surface of the support. Using a spherical particle of support as an example, in the ideal case an eggshell distribution of a metal is tantamount to the metal being concentrated in a thin shell at, and immediately below, the surface of the support, with none in the interior. See, for example, A. V. Neimark, L. I. Kheifez, and V. B. Fenelonov, *Ind. Eng. Chem. Prod. Res. Dev.*, 20, 439 (1981), especially Figure 1 at page 440.

As is usually the case, the ideal is unattainable. However, various approaches to attaining an eggshell distribution have been described. The work of Cervello and coworkers (Preparation of Catalysts, edited by B. Delmon, P. A. Jacobs and G. Poncelet, Elsevier Scientific Publishing Company, Amsterdam (1976)) represents some of the more successful attempts made to date. Although even these workers have not achieved the ideal situation where the interior is devoid of this first metal, nonetheless they have achieved a situation where virtually all of the dispersed metal is contained within a shell of thickness about 0.25 that of the radius. More recently the patentees of U.S. Pat. No. 4,376,724 have claimed to have deposited virtually all the metal within 0.1 radius of the surface.

It can be shown, (see Example 6) that a spherical particle through which is uniformly distributed a metal contains more than 60% of that metal in that portion of the interior of the particle within a distance from the center corresponding to 0.85 of the radius. Stated differently, where there is uniform distribution the outer shell of a thickness corresponding to 0.15 that of the radius contains less than 40% of the dispersed metal. For the purposes of this application, what is meant by an eggshell distribution is a distribution where more than 50% of the dispersed metal is found within about 0.15 radius of the surface. The more idealized the eggshell distribution, the more preferred will be the catalyst. For the purpose of this application an ideal distribution is one where all of the metal is within 0.15 radius of the surface.

The metals used in this invention are the Group VIII metals. In particular, cobalt, nickel, ruthenium, rhenium, palladium, rhodium, osmium, iridium, platinum, and combinations thereof are suitable in the practice of this invention. Nickel is a particularly desirable metal to be used in the catalyst, although palladium, rhodium, and platinum also are highly desirable. The concentration of the metal is not important per se so long as an eggshell distribution is attained. However, relatively low metal loadings, less than about 10%, are found to facilitate attainment of an eggshell distribution, with loadings up to about 5% particularly preferred.

The support unto which the metal is dispersed is a porous support of various metal oxides. Among the metal oxides which may be used are included alumina, silica, thoria, magnesia, titania, and combinations thereof. Various clays, such as kieselguhr, bentonite, and so forth, also may be used advantageously. Among the aforementioned supports gamma-alumina is a particularly preferred support, with theta-alumina also being highly desirable. By porous support is meant a support having a micropore volume of at least 0.2 ml per gram, and a macropore volume of at least 0.1 ml per gram. By micropore volume is meant the total volume of pores under about 117 Angstroms in size; by macropore volume is meant the volume of the larger pores.

The catalysts of this invention may be made by any method achieving an eggshell distribution of the dispersed metal. One such method as described by Neimark, op. cit., achieves surface impregnation by presaturating the pores of the support with solvent before contacting the support with the metal-containing impregnating solution. The diffusion of impregnating solution into the presaturated pores is very slow, hence most of the metal is deposited on the surface. Another method, described by Cervello, op. cit., achieves surface impregnation by selective precipitation of a metal salt, where initial impregnation of the support with an aqueous metal solution is followed by a treatment which precipitates the metal inside the support. Precipitation produces a concentration depletion in the liquid filling the pores with a concentration gradient created which forces the solute to migrate outward. The adsorbed species then redissolves to compensate for the migration and also moves to the exterior, where it precipitates. It must be clearly understood that the above methods are only exemplary and are not exclusive. What is important is the attainment of an eggshell distribution, and not the manner of attaining it.

After impregnation of the metal via a soluble metal salt the metal is reduced to the zerovalent state and the composite may be calcined, both performed according to methods well known to one skilled in the art.

Hydrogenation conditions embrace a temperature from about 100° to about 300° C. at a hydrogen pressure from atmospheric up to about 300 psig. Because the selectivity of hydrogenation seems to increase with increasing temperature and decreasing pressure, there is some advantage to operating at the highest temperature and lowest pressure possible consistent with an acceptable reaction rate. Operationally, a temperature range from about 150° to about 250° C. is preferred. The preferred range of pressure is from about 5 to about 150 psig, with a range from about 5 to about 50 psig being still more preferred.

The method of this invention is equally applicable to a batch or continuous process. In a batch process the fatty material to be hydrogenated is mixed with an effective amount of catalyst and the mixture brought to the desired temperature, which is preferably from about 150° to about 250° C. The mixture is then vigorously agitated under hydrogen pressure, preferably from about 5 to about 150 psig, for a time sufficient to effect the desired degree of hydrogenation, at which time agitation is stopped and catalyst is removed, as by filtration. Hydrogenation time or duration, depends upon the extent of hydrogenation desired, the oil used, the catalyst concentration, and hydrogenation temperature and pressure, may be from about 0.5 hr. up to about 10 hr. The resulting hydrogenated fatty material is then recovered for subsequent processing.

The following description is applicable to a fixed bed operation, although it will be recognized that by suitable changes it may also be applicable to expanded or fluidized bed operation. The catalyst bed may be in the form of pellets, granules, spheres, extrudate, and so forth. The reactor is heated to the desired reaction temperature in a hydrogen atmosphere, often with a small hydrogen flow. After attainment of the desired temperature, the feedstock consisting of fatty material is made to flow over the fixed bed. The flow may be either downflow, as in a trickle bed operation, or upflow, as in a flooded bed operation. The flow rate of the oil may be from about 0.5 to about 20 LHSV, with rates from about 1 to about 5 being more common. When the flow of edible fats and oils is initiated, it is desirable to mix the hydrogen with said fats and oils so as to maintain the desired pressure. Often it is advantageous to admit excess hydrogen, maintaining pressure by partial venting. As the reaction proceeds and the activity of the catalyst bed decreases, adjustments may be made either in the LHSV or the temperature to maintain the desired characteristics of the product. Partially hardened oil is recovered as the effluent in a state suitable for further processing, such as blending, bleaching, or deodorization.

The examples given below are for illustrative purposes only, and are not to be construed as limiting this invention in any way.

EXAMPLE 1

Nickel on gamma-alumina (0.5 g/cc ABD, 200 m²/g SA, 0.5 ml/g micropore volume and 0.3 ml/g macropore volume) was prepared by different methods to afford catalysts with different radial distribution of nickel through the porous support. Catalyst A is a 5% nickel as prepared by a conventional method; Catalyst B is a 5% surface nickel prepared by a prewet technique; Catalyst C is a 1% surface nickel prepared by a precipitation technique. Their detailed preparation is described as follows:

Catalyst A was prepared by impregnating alumina spheres with an aqueous solution of $Ni(NO_3)_2 \cdot 6H_2O$ of sufficient quantity to afford 5% by weight Ni by steam-evaporating the water over a 4-hour period. The composite was calcined in air for 2 hours at 450° C., then reduced with hydrogen at 450° C. for 3 hours.

In Catalyst B the pores were presaturated by shaking the base with deionized water for 1 hour. Impregnation was done analogously to that above, followed by calcination in air at 500° C. for 2 hours and reduction in hydrogen at 500° C. for 1.5 hours.

Catalyst C was prepared by mixing alumina for 20 hours with sufficient solution of Ni(NO$_3$)$_2$.6H$_2$O to afford 1% by weight Ni. After liquid was decanted the alumina was mixed on a rotary mixer with a solution of 0.1N sodium hydroxide for 48 hours, after which liquid was decanted. The solid was washed with distilled water, steam-dried for 1.5 hours, calcined in air at 500° C. for 3 hours, and finally reduced in hydrogen at 500° C. for 2.5 hours.

The catalyst spheres were encapsulated in epoxy, sectioned to about the mid-point and polished smooth. A thin layer of carbon (~200 Å) was evaporated onto the surface to provide electrical conductivity. Scanning electron microscope data were acquired for 500 seconds at each location and data were taken at 50 micron intervals from the edge through the equator to the center (ca. 800 microns).

A least squares analysis of the sample X-ray intensity compared to intensities from known standards was used to obtain what is known as the K-ratio. A plot of the Ni K-ratio/Al K-ratio vs. distance is useful in interpreting metals distribution. Plotting the relative Ni/Al ratio minimizes scatter due to electron beam fluctuations, holes in the sample, etc.

The electron microprobe data are reproduced in FIG. 1. It can be readily seen that A represents the most uniformly dispersed nickel composite, whereas C achieves the "best" eggshell distribution. As described more fully in Example 6, in C more than 62% of the metal is found within about 0.16 fractional radii of the surface. Catalyst "B" represents an intermediate case.

EXAMPLES 2–5

Continuous hydrogenations were conducted in a tube reactor containing a fixed-bed of 50 cc of catalyst. The reactor had a preheater section for bringing the feedstock to temperature and a heater for the reaction zone. The feedstock, soybean oil, was mixed with an excess of hydrogen prior to the preheater, and then passed upflow over the catalyst bed. The excess H$_2$ was vented at the high pressure separator (keeping a constant reactor pressure), and the product was collected. Fatty acid distribution was determined by a modified AOCS method CE2-66. Iodine value was calculated from the measured fatty acid distribution. Solid fat index was determined by AOCS method CD10-57.

Results of continuous hydrogenations using various catalysts are tabulated below. In Example 2 the catalyst is a 5% nickel on gamma-alumina, preparation A of Example 1. The catalyst of Example 3 is a 5% nickel on a non-porous support, alpha-alumina (1.4 g/cc ABD, 3 m$^2$/g SA, 0.03 ml/g micropore volume, 0.20 ml/g macropore volume); the catalyst of Example 4 is a 1% nickel on gamma-alumina dispersed with an eggshell distribution and is Catalyst C of Example 1, and that of Example 5 is a 1% nickel on a non-porous support.

TABLE 1

| Continuous Hydrogenation of SBO | | | | |
|---|---|---|---|---|
| Example | 2 | 3 | 4 | 5 |
| Temp. (°C.) | 195 | 195 | 195 | 195 |
| Press. (psig) | 50 | 50 | 50 | 50 |
| LHSV (hr$^{-1}$) | 3 | 3 | 3 | 3 |
| H$_2$ Flow (scf/hr) | 0.4 | 0.4 | 0.4 | 0.4 |
| Fatty Acid Distribution | | | | |
| 14-0 | — | — | 0.1 | 0.1 |
| 16-0 | 10.3 | 10.1 | 10.4 | 10.7 |

TABLE 1-continued

| Continuous Hydrogenation of SBO | | | | |
|---|---|---|---|---|
| Example | 2 | 3 | 4 | 5 |
| 16-1 | — | — | 0.1 | 0.1 |
| 17-0 | — | — | 0.1 | 0.1 |
| 16-0P + 17-1 | — | — | — | 0.1 |
| 18-0 | 7.8 | 5.1 | 4.9 | 5.4 |
| 18-1 | 49.3 | 40.8 | 37.4 | 40.4 |
| 18-2 | 30.4 | 40.7 | 42.5 | 38.9 |
| 18-3 | 2.2 | 3.3 | 3.6 | 3.1 |
| >20 | — | — | 0.9 | 1.1 |
| Calc. IV | 100.7 | 114.1 | 116.5 | 111.9 |
| ΔIV | 33.0 | 19.6 | 18.9 | 23.0 |
| S$_{LN}$ | 1.8 | 2.3 | 2.6 | 2.3 |
| S$_{LO}$ | 7.7 | 15.6 | 13.9 | 11.0 |
| SFI | | | | |
| 50° C. | | 6.4 | 7.9 | |
| 70° C. | | 2.3 | 1.6 | |
| 80° C. | | 1.1 | 0 | |
| 92° C. | | 0.3 | 0 | |
| 104° C. | | 0.2 | 0 | |

Comparison of Examples 2 and 3 show the increased selectivity of nickel on a non-porous support (alpha-alumina of 3) compared with a porous support (gamma-alumina of 2). Example 4 shows the enhanced selectivity of nickel when dispersed with an eggshell distribution on a porous support with substantial increases in both S$_{LN}$ and S$_{LO}$ being observed relative to its "uniformly" dispersed counterpart, Example 2. Comparison of Examples 4 and 5 shows that the porous support containing eggshell-like dispersed nickel is comparable in selectivity to nickel on a non-porous support.

EXAMPLE 6

Relative volumes and amounts of metal deposited in a portion of a sphere may be determined from simple mensuration formulae as follows. Let C(r) be the concentration of metal in a sphere at a point r from its center. The total amount of metal, M, in a spherical shell between the points r$_1$, r$_2$ is $$M = \int_{r_1}^{r_2} C(r) dV$$

where dV is the volume of a shell between r and r+dr, and is given by the formula $$dV = 4\pi r^2 dr$$

Therefore, $$M = 4\pi \int_{r_1}^{r_2} C(r) r^2 dr$$

Because frequently it is more convenient to work in dimensionless parameters, let $$f = r/R_o$$

where R$_o$ is the radius of a spherical particle, and f is the distance from the center expressed as a fraction of the radius. The expression for M then becomes, $$M = 4\pi R_o^3 \int_{r_1}^{r_2} C(f) f^2 df$$

Where metal deposition is uniform throughout the sphere C(f) is constant. In such a case the amount of metal in the outer portions of the sphere, defined by a concentric shell from the surface (f=1) to some point, $f_1$, below the surface, relative to the amount of metal in the inner portions of the sphere from $f_1$ to the center (f=0) is, $$\frac{M_{outer}}{M_{inner}} = \frac{\int_{f_1}^{f} f^2 df}{\int_{0}^{f_1} f^2 df} = \frac{1-f_1^3}{f_1^3}$$

At $f_1=0.794$ there are equal amounts of metal in the outer and inner portions of the sphere, $M_{outer}=M_{inner}$. That is to say, for uniform radial distribution of metal in a sphere half of the total amount of metal is found in a thin shell near the surface whose depth is 0.206 that of the radius. Analogously, at f=0.85 the ratio $M_{outer}$ to $M_{inner}$ is 0.628, or 38.6% of the metal is located in the outer shell.

The electron microprobe data of Catalyst C in Example 1 were smoothed and each of two regions were approximated by a straight line. The relevant expressions for metal concentration were, $$C = 0.0135f + 0.0240 \quad 0 \leq f \leq 0.8437$$
$$C = 0.5541f - 0.4321 \quad 0.8437 \leq f \leq 1$$

Defining the outer shell as one extending from the surface (f=1) to a point 0.1563 fractional radii beneath the surface (f=0.8437), $$\frac{M_{outer}}{M_{inner}} = \frac{\int_{0.8437}^{1.0} (0.5541f - 0.4321)f^2 df}{\int_{o}^{0.8437} (0.0135f + 0.0240)f^2 df}$$

$$= \frac{\frac{0.5541}{4} |f^4|_{0.8437}^{1.0} - \frac{0.4321}{3} |f^3|_{0.8437}^{1.0}}{\frac{0.D135}{4} |f^4|_{o}^{0.8437} + \frac{0.0240}{3} |f^3|_{o}^{0.8437}}$$

$$\frac{M_{outer}}{M_{inner}} = 1.66$$

Stated differently, the result is that about 62% of the metal is located in a thin shell near the surface whose thickness is less than 0.16 fractional radii. By way of comparison, were the metal distributed uniformly the amount in that same outer shell would be 0.665 that in the inner shell. Hence, 2.5 times as much metal is found in the outer shell of Catalyst C of Example 1 as would be found were the metal distributed uniformly.

EXAMPLE 7

Impregnation of a porous inorganic oxide with a platinum metal anion in the absence of added acid generally affords an eggshell distribution of the metal. Gamma-alumina may be mixed with an aqueous solution of hexachloroplatinic acid, in an amount sufficient to provide up to about 1% by weight platinum, with steam evaporation of water over about 4 hours. The solid may be calcined in air at 500° C. for 2 hours, then reduced in hydrogen at 500° C. for 2 hours to afford the finished catalyst.

EXAMPLE 8

To gamma-alumina spheres presoaked in deionized water for one hour may be added a sufficient amount of an aqueous solution of ruthenium chloride to afford 1% by weight ruthenium, and water may be removed by steam evaporation over about 4 hours. The resulting solid may be reduced directly in hydrogen at 450° C. for about 2 hours.

EXAMPLE 9

Theta-alumina spheres (surface area 65 m²/g, micropore volume 0.42 ml/g, macropore volume 0.62 ml/g) may be impregnated with nickel as described for Catalyst C of Example 1 to afford a 1% Ni on theta-alumina.

What is claimed is:
1. A method for the selective reduction of a fatty material comprising contacting under hydrogenation conditions the fatty material with hydrogen and a catalyst which comprises a zerovalent Group VIII metal dispersed with an eggshell distribution on a porous support selected from the group consisting of alumina, silica, thoria, magnesia, titania, and combinations thereof, and recovering the selectively reduced product.
2. The method of claim 1 where the fatty material is a liquid vegetable oil.
3. The method of claim 2 where the liquid vegetable oil is selected from the group consisting of soybean oil, cottonseed oil, corn oil, sunflower oil, safflower oil, rapeseed oil, and liquid fractions from palm oil.
4. The method of claim 3 where the oil is soybean oil and contacting is of a duration sufficient to lower its iodine value from about 15 to about 25 units.
5. The method of claim 1 where the metal is selected from the group consisting of cobalt, nickel, ruthenium, rhodium, palladium, osmium, iridium, platinum or combinations thereof.
6. The method of claim 5 where the metal is nickel.
7. The method of claim 5 where the metal is palladium or platinum.
8. The method of claim 5 where the metal is rhodium.
9. The method of claim 1 where the support is gamma-alumina.
10. The method of Claim 1 where the support is theta-alumina.
11. The method of claim 1 where hydrogenation conditions include a hydrogen pressure from atmospheric to about 500 psig and a temperature from about 100° to about 300° C.
12. The method of claim 11 where the pressure is from about 5 to about 150 psig.
13. The method of claim 12 where the pressure is from about 5 to about 50 psig.
14. The method of claim 11 where the temperature is from about 150° to about 250° C.
15. The method of claim 1 where reduction is effected in a batch process.
16. The method of claim 1 where reduction is effected in a continuous process.

* * * * *